United States Patent [19]
Gorski

[11] 3,870,125
[45] Mar. 11, 1975

[54] GUIDE BAR OILING SYSTEM FOR CHAIN SAW

[75] Inventor: Walter Gorski, Armonk, N.Y.

[73] Assignee: Textron Inc.,, Providence, R.I.

[22] Filed: Feb. 2, 1973

[21] Appl. No.: 329,207

[52] U.S. Cl................... 184/15 R, 30/383, 83/169, 123/196 CP
[51] Int. Cl.............................................. F16n 7/16
[58] Field of Search ....... 30/383; 83/169; 184/15 R; 123/196 CP; 143/32

[56] References Cited
UNITED STATES PATENTS

| | | | |
|---|---|---|---|
| 1,338,157 | 4/1920 | Rains | 83/169 |
| 2,444,138 | 6/1948 | Mall | 83/169 |
| 2,809,718 | 10/1957 | Kos | 83/169 |
| 2,827,932 | 3/1958 | Strunk | 83/169 |
| 2,883,000 | 4/1959 | Mattson | 83/169 |
| 2,896,746 | 7/1959 | Gudmundsen | 83/169 |
| 2,944,538 | 7/1960 | Conway | 83/169 |
| 2,992,660 | 7/1961 | Merz | 83/169 |
| 3,010,538 | 11/1961 | Strunk | 83/169 |
| 3,044,506 | 7/1962 | Oehrli | 184/15 R |
| 3,185,191 | 5/1965 | Olsen | 83/169 |
| 3,581,783 | 6/1971 | Sandin | 143/32 |

FOREIGN PATENTS OR APPLICATIONS

| | | | |
|---|---|---|---|
| 360,213 | 9/1922 | Germany | 184/15 |

Primary Examiner—Manuel A. Antonakas
Assistant Examiner—Daniel J. O'Connor
Attorney, Agent, or Firm—Robert E. Burns; Emmanuel J. Lobato; Bruce L. Adams

[57] ABSTRACT

A saw chain running on a guide bar having a peripheral groove between two side flanges is lubricated by means of an oil hole extending through one of the flanges into the groove. Oil is supplied to the oil hole from the chain saw chassis on which the bar is mounted. The inner end of the oil hole opening into the groove is of limited area and is located sufficiently close to the edge of the flange so as to lie wholly within the area of the inner face of the flange that is swept by tangs of the saw chain running in the groove of the guide bar. The oil hole is thereby prevented from clogging.

15 Claims, 9 Drawing Figures

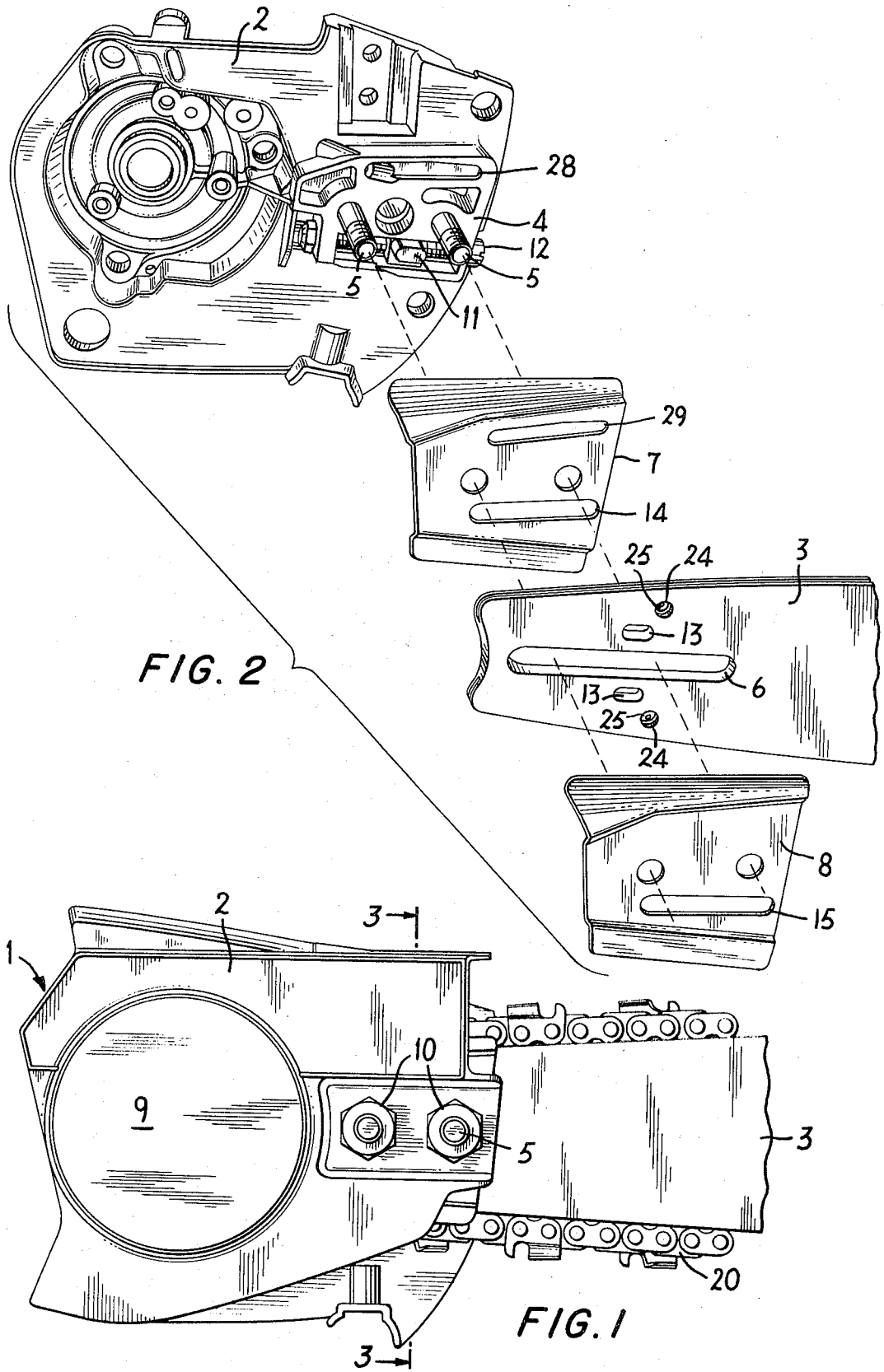

GUIDE BAR OILING SYSTEM FOR CHAIN SAW

FIELD OF INVENTION

The present invention relates to chain saws and particularly to lubricating the saw chain running on the guide bar of a chain saw.

BACKGROUND OF INVENTION

In a chain saw, the saw chain runs on a guide bar which is mounted on the chassis or power head of the chain saw. The guide bar is a flat, elongated bar which projects forwardly from the chain saw power head and has a rounded forward end which may, if desired, comprise a roller or sprocket. The guide bar has spaced peripherally extending side flanges which define between them a peripherally extending groove. The saw chain is a link chain customarily comprising side links having surfaces which slide on the outer edges of the peripheral side flanges of the guide bar and center links which are provided with tangs which extend into the peripheral groove of the bar. These tangs guide the chain on the guide bar and are engaged by a sprocket adjacent the inner end of the guide bar in order to drive the chain.

By reason of the sliding friction of the chain on the guide bar, it is necessary to lubricate the chain in order to prevent heating and rapid and excessive wear. For this purpose it is known to provide the guide bar with an oil hole extending through one of the side flanges of the guide bar near its inner end. On the chain saw power head there is provided an oil tank or chamber connected by suitable passageways to the oil hole in the guide bar. A manually or power operated pump is provided for delivering the lubricating oil from the oil tank or chamber to the oil hole of the guide bar. The oil passing through the hole is picked up by the tangs of the chain running in the groove of the guide bar and distributed around the guide bar so as to lubricate the surfaces on which the chain runs. Lubrication of the guide bar and chain is thus provided.

However, it has been found in practice that the oil hole in the guide bar frequently becomes clogged with sawdust and dirt so that lubricating oil is not delivered to the groove of the guide bar. When this happens excessive friction of the chain running on the guide bar results in increased drag on the chain, excessive heating and rapid wear which permanently damages the guide bar and chain.

SUMMARY OF THE INVENTION

It is an object of the present invention to alleviate the problem of oil hole clogging and to provide safe and dependable lubrication of the chain and guide bar of a chain saw.

In accordance with the present invention the inner end of an oil hole provided in the side flange of a chain saw guide bar is of limited cross sectional area and opens wholly in an area of the inner face of the side flange sufficiently near the outer edge of the flange to be swept by the tangs of the center links as the chain runs on the guide bar. The reason why an oil hole of this nature has not been found to clog is by no means obvious. However, a possible explanation is that the restricted cross sectional area of the oil hole, at least at its inner end, results in a higher oil velocity and that the tangs of the chain by sweeping across the entire area of the inner end of the oil hole keep the oil hole clear of sawdust and dirt.

The outer end of the oil hole in the side flange of the guide bar may be of larger cross sectional area than the inner end to provide for convenient communication with a passage of the chain saw chassis by which lubricating oil under pressure is delivered to the oil hole. For example, the oil hole may be tapered or countersunk or it may conveniently be formed by pressing a disc into an aperture provided in the side flange of the guide bar and providing a small hole in the disc, the inner face of which is flush with the inner surface of the side flange. The hole in the disc is preferably eccentric so as to be in that portion of the disc which is nearest the outer edge of the side flange.

For convenience of manufacture the oil hole is preferably of circular cross section although other cross sectional shapes may also be used. It has been found that with an oil hole of circular cross section, the inner end of the hole opening into the groove of the guide bar should preferably have a diameter of between one thirty-second inch and one-eighth inch. Preferably, the diameter of the hole is between one-sixteenth inch and three thirty-second inch. When oil is supplied by engine driven pumping means, the rate of oil delivery to the oil hole is preferably at least 2 cc per minute. In order to avoid an excess of oil, the maximum delivery rate should preferably be about 6 cc per minute for small chain saws and 15 cc per minute for big chain saws, with intermediate values for saws of intermediate size.

BRIEF DESCRIPTION OF DRAWINGS

The objects and advantages of the present invention will be more fully understood from the following description in conjunction with the accompanying drawings which illustrate by way of example preferred embodiments of the invention and in which:

FIG. 1 is a partial side view of a chain saw having guide bar and saw chain lubricating means in accordance with the present invention;

FIG. 2 is an exploded view showing parts of the chain saw shown in FIG. 1 and illustrating the mounting of the guide bar on the chain saw power head;

DESCRIPTION OF PREFERRED EMBODIMENTS

Figure 3:
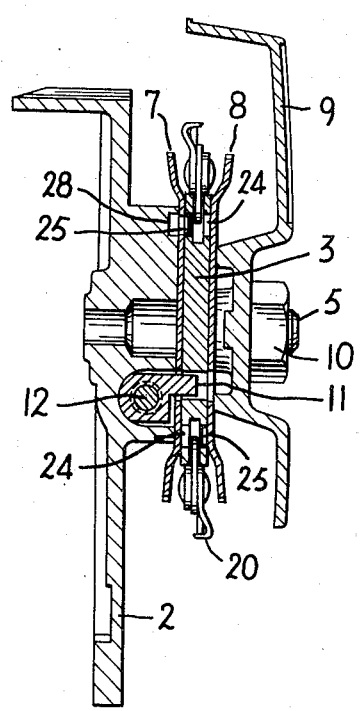
FIG. 3 is a partial cross section taken approximately on the line 3—3 in FIG. 1.

In FIGS. 1, 2 and 3 of the drawings there is shown a chain saw 1 having a power head or chassis 2 comprising a motor or engine housed in a suitable casing and provided with the usual accessories. A guide bar 3 is mounted on a suitable mounting face 4 of the power head by means of bolts 5 extend through an elongated slot 6 provided in an inboard portion of the guide bar. Inner and outer shims or guard plates 7 and 8 respectively are disposed on opposite sides of the guide bar and are provided with suitably spaced holes to receive the bolts 5. The bolts further extend through holes in a cover 9 and are provided with nuts 10. When the nuts are tightened, the assembly comprising the guide bar 3, guard plates 7 and 8 and the cover 9 are clamped securely on the mounting face 4 of the power head. The slot 6 in the guide bar is sufficiently elongated to permit longitudinal adjustment of the guide bar on the power head to regulate the tension of the saw chain. Adjustment is effected by means of a finger 11 provided on a nut threaded on a screw 12 which is rotatably mounted on the engine chassis parallel to the slot 6 of the guide bar. The finger 11 engages in an opening 13 in the guide bar, two such openings being provided symmetrically in the guide bar so that the guide bar is symmetrical about its longitudinal and can be mounted alternatively with either face facing outwardly. Slots 14 and 15 are provided respectively in the guard plates 7 and 8 to accommodate the finger 11 of the chain tension adjusting mechanism.

Figure 4:
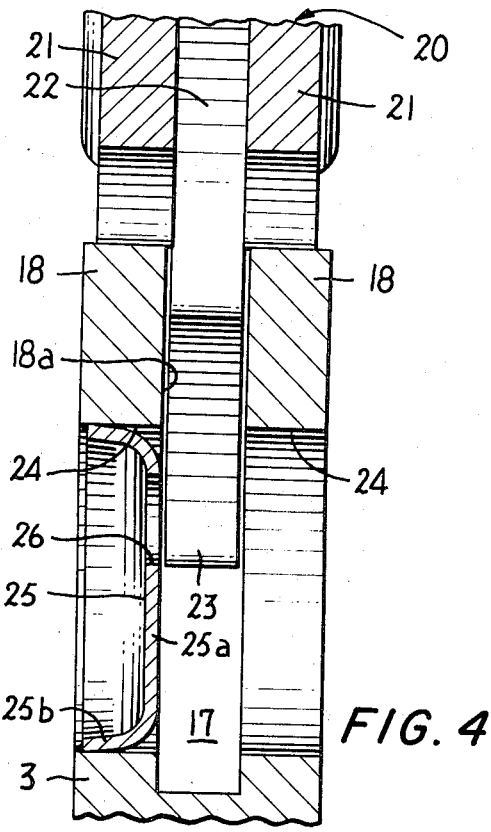
FIG. 4 is an enlarged cross section of a portion of the chain saw guide bar illustrating the provision of lubricating means in accordance with the invention.

Referring to FIG. 4, the guide bar 3 has a peripherally extending groove 17 between two peripherally extending side flanges 18. A saw chain 20 running on the guide bar has side links 21 with bearing surfaces sliding on the outer edges of the side flanges 18 of the guide bar and spaced center links 22 having tangs 23 extending into the groove 17 of the guide bar. At the inboard end of the guide bar the tangs 23 of the center links are engaged by a sprocket (not shown) to drive the saw chain around the guide bar. The tangs 23 of the saw chain are shorter than the depth of the groove 17 in the guide bar so that they do not extend all of the way to the bottom of the groove. The distance the tangs project into the groove may, for example, be approximately 50 to 75 percent of the depth of the groove and is shown by way of example in FIG. 4 as being about 60 percent. Hence, as the chain slides around the guide bar, the tangs 23 are in sliding contact with an area 18a of the inner face of each of the side flanges 18 which extends inwardly from the outer edge of the respective side flange a distance equal to the length of the tangs 23.

In order to lubricate the saw chain 20 as it runs around the periphery of the guide bar, an oil hole is provided to supply oil to the groove 17 so that it is picked up by the chain and distributed around the periphery of the guide bar. For this purpose a cylinderical aperture 24 is provided in one of the side flanges 18 of the guide bar in the inboard end portion of the bar that overlies the supporting surface 4 of the power head when the bar is mounted on the power head. For convenience of manufacture, an aligned aperture 24 is also formed in the opposite side flange 18. Moreover, corresponding apertures are formed in the side flanges of the bar at an opposite location which is symmetrical with respect to the slot 6 so that the bar is reversible as stated above. As seen in FIG. 4, the cylinderical aperature 24 is spaced inwardly from the outer edge of the guide bar and opens into an inner portion of the groove 17. This leaves sufficient material in the outer edge portion of the flange to avoid cracking when the bar is heat treated. The innermost portion of the aperture 24 is near the bottom of the groove 17 while the outermost portion is closer to the outer edge of the flange 18 than to the bottom of the groove. The diameter of the aperture 24 is approximately 50 to 60 percent of the depth of the groove 17. By way of example, the diameter of the aperture 24 may be 0.188 inch with a groove depth of 0.34 inch.

Figure 5:
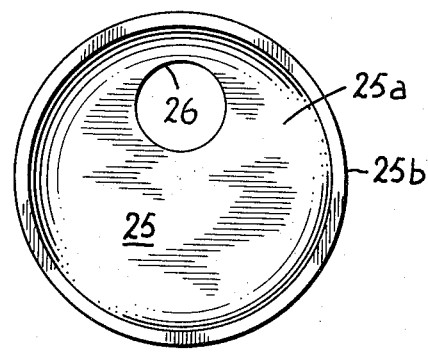
FIGS. 5 and 6 are respectively a front view and and edge view of a disc which is pressed into an aperture in a side flange of the guide bar and is provided with an eccentric oil hole of restricted cross sectional area.
Figure 6:
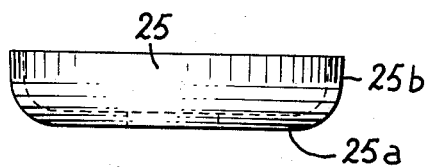

A cup-shaped disc 25 set in the aperture 24 has a flat bottom 25a and a peripheral rim portion 25b. The disc 25 is suitably secured in the aperture 24, for example by being a press fit or by means of welding, brazing or adhesive. The inner face of the bottom portion 25a is flush with the inner face of the flange 18. The rim portion 25b is shown as extending approximately to the outer face of the side flange 18 but it may extend a lesser distance if desired. A hole 26 is formed in the bottom of the disc 25 so as to open into the groove 17 of the guide bar. As seen in FIGS. 4 and 5, the hole 26 is located eccentrically so as to be in that portion of the disc nearest the outer edge of the flange 18. Moreover, the diameter of the hole 26 is considerbly smaller than that of the aperture 24 and disc 25. By reason of its small diameter and its eccentric location, the hole 26 lies wholly within the area 18a of the inner surface of the flange 18 that is swept by the tangs 23 of the chain as the chain runs on the guide bar. While the hole 26 is shown as being circular, since this is the most convenient shape from the point of view of manufacturer, it can be of other shape if desired, for example oval or elongated in the direction of travel of the chain. When the disc 25 is set in the aperture 24 as seen in FIG. 4, it provides in effect an eccentrically countersunk oil hole in the flange 18 with an outer portion of large diameter formed by the inside of the rim 25b and an eccentrically disposed inner portion of small diameter formed by the hole 26. The diameter of the hole 26 is between one thirty-second and one-eighth inch and preferably between one-sixteenth and three thirty-second inch. As the disc 25 is relatively thin in comparison with the thickness of the side flange 18, the small diameter inner portion of the oil hole formed by the hole 26 in the disc is relatively short. Preferably the thickness of the disc 25 does not exceed half the thickness of the side flange 18. In the illustrated embodiment, the thickness of the disc 25 is about 0.010 inch and the diameter of the hole 26 is about 0.050 inch.

Means is provided on the power head for supplying lubricating oil under pressure to the oil hole defined by the disc 25 with its hole 26. The oil supply means is shown as comprising an elongated recess 28 in the supporting surface 4 of the power head in position to register with the oil hole of the bar when the bar is mounted on the power head. The chain saw is provided with a suitable tank or reservoir for the lubricating oil and with pumping means (not shown) which is manually operable or driven by the engine to supply oil under pressure to the recess 28. An elongated slot 29 is provided in the inner shim or guard plate 7 in position to provide communication between the recess 28 and the oil hole of the guide bar. The recess 28 and the slot 29 are elongated in a direction parallel to a line connecting the axes of the two bolts 5 so that communication with the oil hole of the guide bar is provided in all positions of the guide bar as it is adjusted longitudinally to regulate chain tension. To provide for reversibility of the guide bar, discs 25 are provided in the two of the apertures 24 that are alternatively registrable with the recess 28 and slot 29 when the guide bar is mounted on the power head with one or other face facing out. The pumping means is preferably of sufficient capacity to deliver oil to the oil hole of the guide bar at a rate of at least 2 cc per minute. This delivery rate in combination with the small size of the hole 26 provides sufficient oil velocity to assist in keeping the hole 26 free from clogging by sawdust. Moreover, it appears that the rapidly repeated rapid passing of the tangs 23 of the chain over the entire area of the inner end of the hole 26 is a factor in keeping the hole free from clogging. The maximum rate of delivery of oil to the oil hole is intended to avoid unnecessary use of oil and may be, for example, 6 cc per minute for small saws and 15 cc per minute for big saws with intermediate values for saw of intermediate size.

Figure 7:
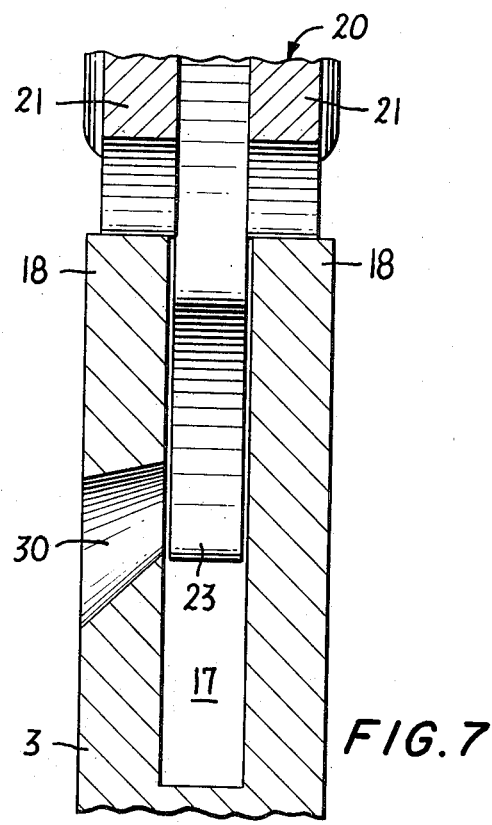
FIGS. 7, 8 and 9 are fragmentary cross sections similar to FIG. 4 but illustrating other constructions.

It is found desirable to have the outer portion of the oil hole in the side flange of the guide bar of larger diameter and extending further from the outer edge of the side flange while the inner portion of the hole opening into the groove 17 is of smaller diameter and sufficiently close to the outer edge of the flange to be swept by the tangs of the center links of the saw chain. In the embodiment shown in FIG. 7, the oil hole 30 is tapered with the outer end of the hole of larger diameter than the inner end. Moreover, the hole is inclined with respect to the plane of the guide bar so that the center of the inner end of the hole is closer to the outer edge of the side flange than the center of the outer end of the hole 30.

Figure 8:
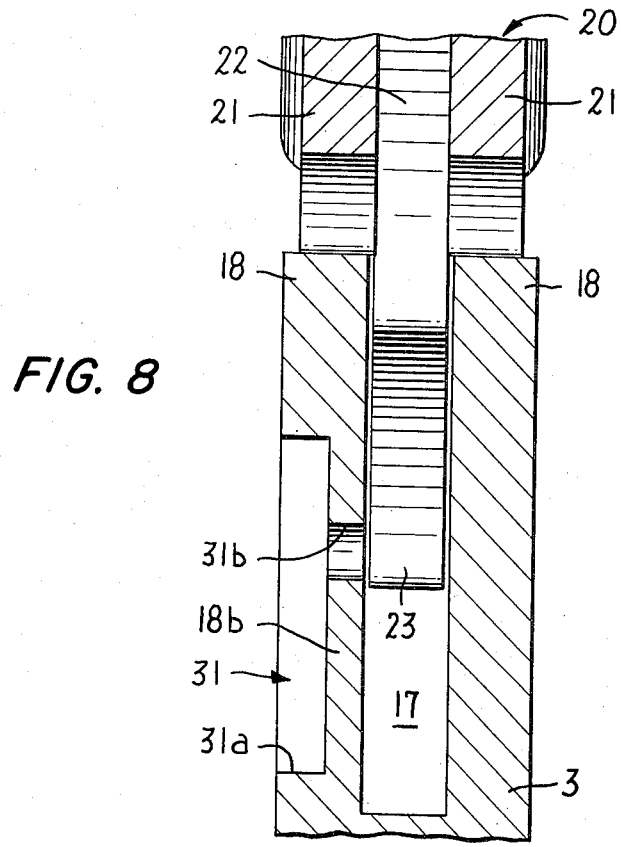

In FIG. 8 there is shown another embodiment in which an oil hole 31 is countersunk so as to provide an outer portion 31a of larger diameter and an inner portion 31b of smaller diameter. The outer portion 31a of larger diameter preferably extends into the side flange a distance at least half the thickness of the wall of the side flange so that the thickness of the remaining wall portion 18b through which the smaller hole portion 31b extends does not exceed half the total thickness of the side flange. Moreover, it will be noted that the inner portion 31b of the oil hole is eccentric with respect to the outer portion 31a so that its center is closer to the outer edge of the side flange 18 than is the center of the outer portion 31a.

Figure 9:
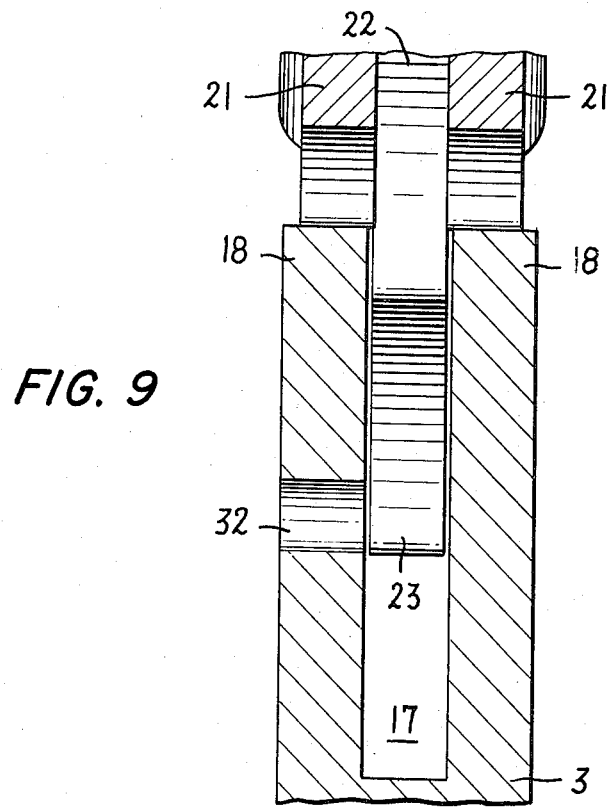

In FIG. 9 there is shown a further embodiment in which an oil hole 32 provided in a side flange 18 of the guide bar is of constant diameter and extends perpendicular to the plane of the guide bar. The size of the oil hole is within the ranges set out above and the oil hole is sufficiently close to the outer edge of the side flange 18 so that the inner end of the hole lies wholly within an area of the inner face of the side flange that is swept by the tangs of the center links of the chain as the chain runs on the guide bar.

With the construction in accordance with the present invention it has been found that clogging of the oil hole is avoided even when the saw is operating under the most severe conditions. Continual and effective lubrication of the chain on the guide bar is thereby assured.

While preferred embodiments of the invention have been illustrated in the drawings and are herein described, it will be understood that other modifications are possible within the scope of the invention.

What I claim and desire to secure by Letters Patent is:

1. In a chain saw having a power head with a support surface to receive a guide bar, a guide bar having an inboard end portion, means for removably securing the inboard end portion of said guide bar to the power head of the chain saw in a position overlying said support surface, said guide bar having at its periphery two peripherally extending side flanges defining between them a peripherally extending groove, a saw chain running on said guide bar and comprising links having support surfaces sliding on outer edges of said side flanges to support the chain on the guide bar and links with tangs extending into said peripheral groove of the guide bar a distance less than the depth of said groove and slidably engageable with an area of the inner surface of each said side flange extending in from the outer edge of said flange a distance equal to the inward extent of said tangs, said guide bar having in its inboard end portion an oil hole extending through one said side flange and opening into said peripheral groove, the inner end of said oil hole opening in the inner face of the respective side flange wholly within the area thereof engageable by said tangs and the diameter of the inner end of said oil hole where it opens into the groove of the guide bar being between one thirty-second inch and one-eight inch, and means on said power head for supplying lubricating oil under pressure to said oil hole to lubricate said chain, including a recess in said supporting surface in position to communicate with said oil hole and an oil supply passage communicating with said recess, the cross sectional area of said oil hole varying within the thickness of the respective side flange so as to have a larger cross sectional area at the outer face of said side flange for communication with said recess than at the inner face of said side flange, said tangs sweeping the inner end of said oil hole to inhibit clogging of said oil hole by sawdust or other particles.

2. A chain saw according to claim 1, in which a guard plate interposed between said support surface and the inboard end portion of said guide bar has an elongated opening communicating with said recess in said support surface and with said oil hole in the guide bar.

3. A chain saw according to claim 1, in which the diameter of the inner end of said oil hole where it opens into the groove of the guide bar is between one-sixteenth inch and three thirty-second inch.

4. A chain saw according to claim 1, in which said oil hole tapers progressively from a larger cross-sectional area at the outer face of the respective side flange of said guide bar to a smaller cross-sectional area at the inner face.

5. A chain saw according to claim 1, in which said oil hole is countersunk, with an outer portion of larger cross sectional area and an inner portion of smaller cross-sectional area.

6. A chain saw according to claim 5, in which said inner portion of smaller cross-sectional area is eccentric with respect to said outer portion of larger cross-sectional area, the center of said inner portion being nearer the outer edge of the respective side flange than the center of said outer portion.

7. A chain saw according to claim 6, in which said side flange is provided with an aperture extending through said flange and a disc secured in said aperture is thinner than said flange and has an inner face flush with the inner face of said flange, said disc therein htherein an eccentric hole constituting said inner portion of said oil hole.

8. A chain saw according to claim 1, in which said oil supplying means delivers oil to said oil hole at a rate of at least 2 cc per minute.

9. A chain saw according to claim 1, in which said oil hole is in the outer 75 percent of the depth of said groove.

10. In a chain saw having a power head with a support surface to receive a guide bar, a guide bar having an inboard end portion, means for removably securing the inboard end portion of said guide bar to the power head of the chain saw in a position overlying said support surface, said guide bar having at its periphery two peripherally extending side flanges defining between them a peripherally extending groove, a saw chain running on said guide bar and comprising links having support surfaces sliding on outer edges of said side flanges to support the chain on the guide bar and links with tangs extending into said peripheral groove of the guide bar a distance less than the depth of said groove and slidably engageable with an area of the inner surface of each of said side flange extending in from the outer edge of said flange a distance equal to the inward extent of said tangs, said guide bar having in its inboard end portion an oil hole extending through one said side flange and opening into said peripheral groove, the inner end of said oil hole opening in the inner face of the respective side flange wholly within the area thereof engageable by said tangs and the diameter of the inner end of said oil hole where it opens into the groove of the guide bar being between one thirty-second inch and one-eighth inch, and means on said power head for supplying lubricating oil under pressure to said oil hole to lubricate said chain, including a recess in said support surface in position to communicate with said oil hole and an oil supply passage communicating with said recess, the center of the opening of said oil hole in the inner face of the respective side flange being closer to the outer edge of said flange than the center of the opening of said oil hole in the outer face of said flange, said tangs sweeping the inner end of said oil hole to inhibit clogging of said oil hole by sawdust or other particles.

11. A chain saw guide bar having two peripherally extending side flanges defining between them a peripherally extending groove to receive tangs of a chain running on said guide bar, said guide bar having an inboard end adapted to be mounted on a chain saw chassis, one of said side flanges having an aperture extending through said flange and opening into said groove in the inboard portion of said guide bar and a disc pressed into said aperture with the outer periphery of said disc closely fitting the inner periphery of said aperture, said disc having a thickness less than the thickness of said side flange and having its inner face flush with the inner face of said side flange, said disc having a hole therein to supply oil to a chain running on said guide bar, said hole being eccentric with respect to said disc, the center of said hole being nearer the outer edge of the respective side flange than the center of said disc.

12. A chain saw guide bar according to claim 11, in which said oil hole in said disc has a diameter not less than one thirty-second inch and not greater than one-eighth inch.

13. A chain saw guide bar according to claim 12, in which said oil hole is at or near the periphery of said disc.

14. A chain saw guide bar according to claim 12, in which said disc has a thickness not more than half the thickness of said side flange.

15. A chain saw guide bar according to claim 12, in which said oil hole in said disc has a diameter between one-sixteenth inch and three thirty-second inch.

* * * * *